United States Patent [19]
Martin

[11] 3,990,387
[45] Nov. 9, 1976

[54] POSITION INDICATOR
[75] Inventor: Herbert Roy Martin, East Malvern, Australia
[73] Assignee: General Motors Corporation, Detroit, Mich.
[22] Filed: May 19, 1975
[21] Appl. No.: 578,484

[30] Foreign Application Priority Data
June 4, 1974  Australia............................ 7769/74

[52] U.S. Cl. .......................... 116/124 M; 74/473 R
[51] Int. Cl.² .......................................... G09F 9/40
[58] Field of Search .... 116/124 M, 124 R, DIG. 20; 74/473 R

[56] References Cited
UNITED STATES PATENTS

| 3,695,215 | 10/1972 | Lambiris | 116/124 M |
| 3,805,733 | 4/1974 | Gilbert | 116/124 M |
| 3,830,192 | 8/1974 | Ronewicz et al. | 116/124 R |

Primary Examiner—S. Clement Swisher
Assistant Examiner—Denis E. Corr
Attorney, Agent, or Firm—John P. Moran

[57] ABSTRACT

A vehicle gear shift position indicator having a housing containing a pointer element and a mounting arm secured to one end of that element and projecting laterally therefrom. The pointer element is arranged to traverse an appropriate indicia panel and the mounting arm is connected to the housing through control mechanism which directs the path of movement of the pointer element over the indicia panel. The control mechanism includes a fulcrum about which the arm pivots and a guide which holds the pointer end of the arm to a straight path during such pivotal movement. An actuator cable is secured at one end to a biasing spring and is attached to part of the mounting arm adjacent that cable end so that the arm is moved according to tension in the cable. The biasing spring and mounting arm part are located at opposite sides respectively of a base wall of the housing, and the spring influences the arm, through the cable, to move in one particular direction.

4 Claims, 6 Drawing Figures

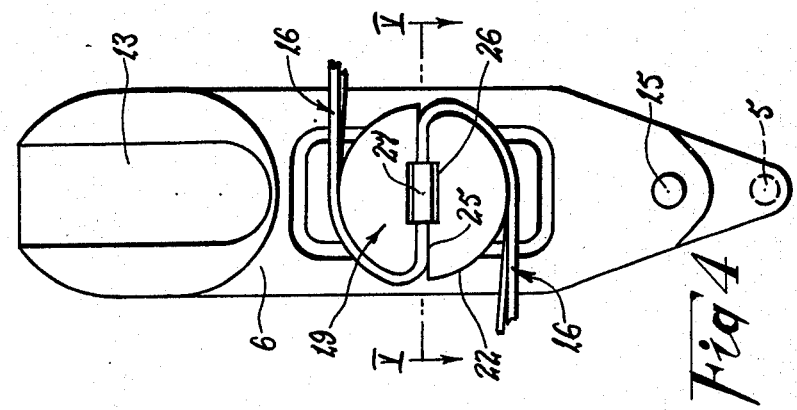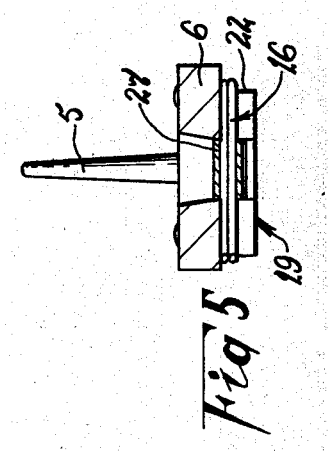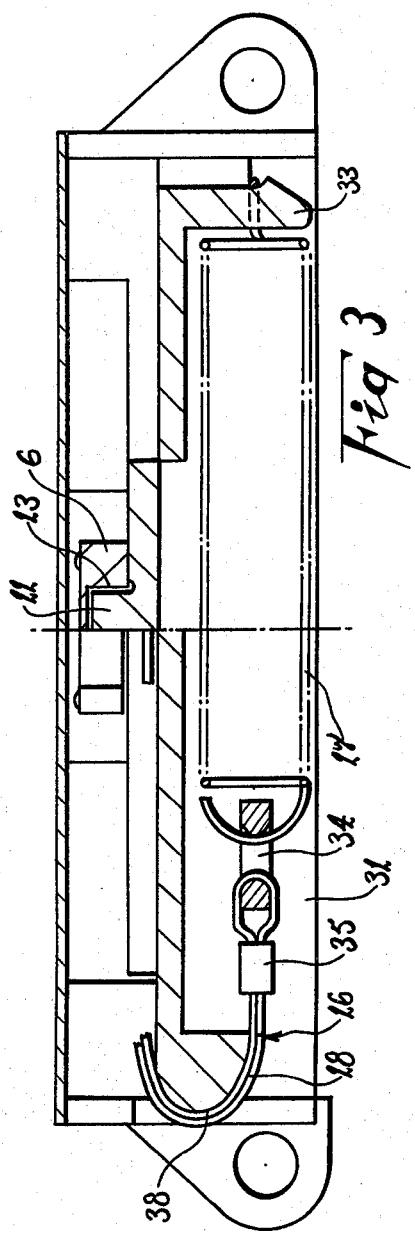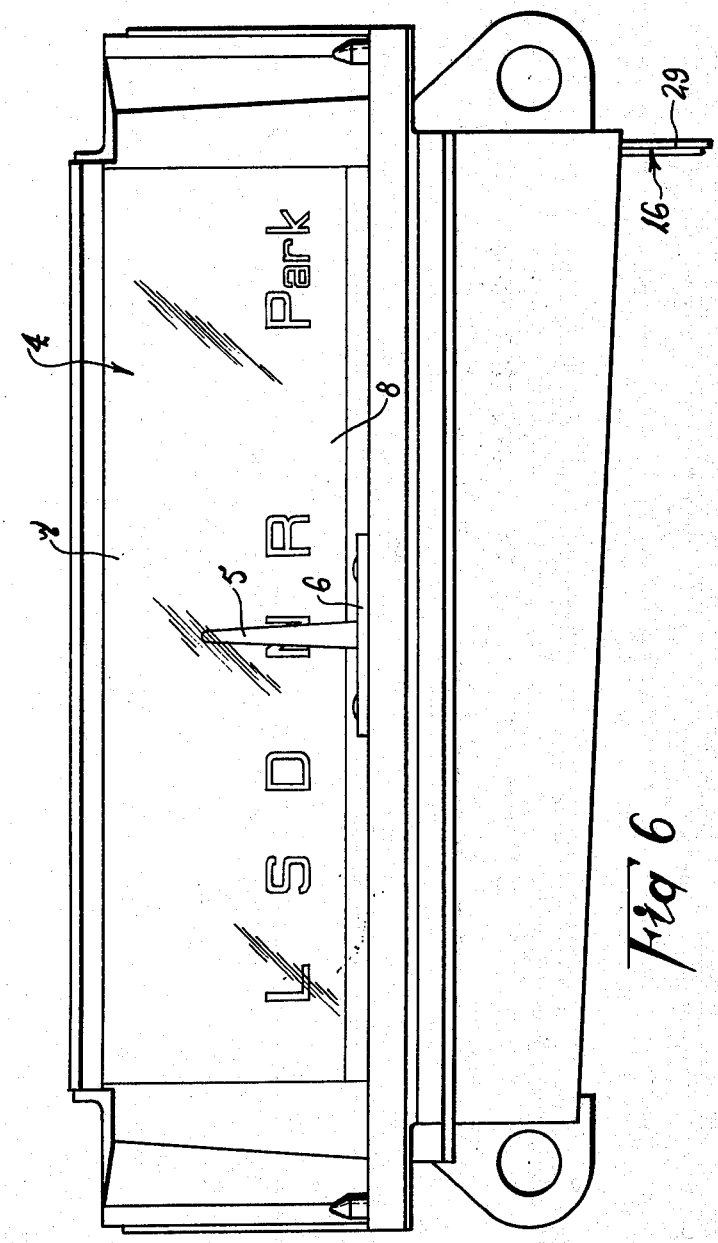

POSITION INDICATOR

This invention relates to means for indicating the position of one part of a mechanism or system relative to another. The invention is especially suited for use in motor vehicles to indicate the various operational positions of the gear shift mechanism, and particularly such mechanism as used with automatic transmission. Consequently, it will be convenient to hereinafter describe the invention in relation to that example application.

Indicators for the shift mechanism of automatic transmissions are well known, and are available in several different forms. A disadvantage common to most prior indicators is that a housing of substantial size is required to contain the indicator element, (pointer or the like) and associated integers arranged to control movement of that element. Furthermore, it is usual to include a multi-strand cable in the connection between the gear shift lever and the pointer, and that cable tends to fret, especially at its zone of attachment with the pointer or pointer control mechanism.

It is a principal object of the present invention to provide a position indicator of the aforementioned kind requiring a housing of relatively small size, and which is effective in operation.

A position indicator in accordance with the invention includes a housing of appropriate form, an indicator member movable relative to the housing between two extreme positions, control mechanism operatively connected to the indicator member so as to direct the movement thereof, and actuating means also connected to the indicator member and being operative to cause movement of that member. The actuator means includes a biasing spring which influences the indicator member to move in one particular direction, and it is a feature of the invention that the spring is mounted on the housing so as to be in overlying relationship with the indicator member at least during part of the movement of that member relative to the housing.

In a preferred form, the indicator member comprises a pointer element and a mounting arm secured to and extending laterally from one end of the pointer element. The control mechanism connects the mounting arm to the housing so as to permit swinging movement of the arm, and includes a guide whereby the pointer element end of the arm is held to a predetermined path of movement (which may be straight) during that swinging movement.

It is further preferred that the actuating means includes a cable secured at one end to the biasing spring and attached, adjacent that end, to part of the mounting arm of the indicator member. The aforementioned mounting arm part and the biasing spring are preferably located on opposite sides respectively of a base wall of the housing, thereby achieving the desired compact construction and the mounting arm is influenced by the spring through the medium of the cable.

The following description refers in more detail to these essential features and further optional features of the invention. To facilitate an understanding of the invention, reference is made to the accompanying drawings where these features are illustrated in preferred form. It is to be understood however, that the essential and optional features of the invention are not limited to the specific forms of these features as shown in the drawings.

In the drawings:

FIG. 3 is a cross-sectional view taken along line III—III of FIG. 1;

FIG. 4 is an underside plane view of the indicator member shown in FIGS. 1 to 3;

FIG. 5 is a cross-sectional view taken along line V—V of FIG. 4; and

FIG. 6 is a front view of the complete assembly shown in FIGS. 1 to 5.

Figure 1:
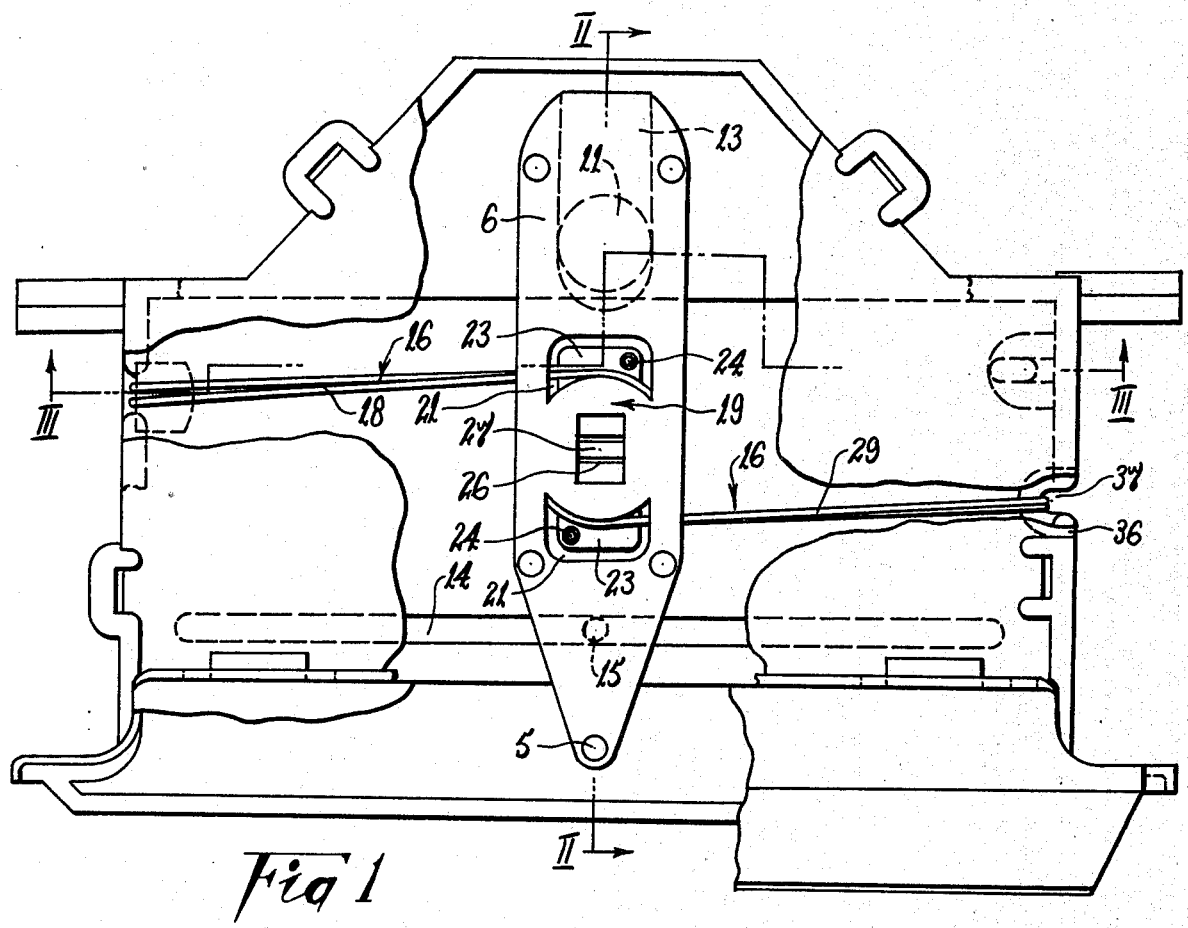
FIG. 1 is a top plane view of an example embodiment of the invention, with parts removed for convenience of illustration.

According to the particular embodiment of the invention shown in the drawings, the housing 2 includes a substantially flat and hollow main section 3 which contains the control mechanism, and a further section 4 which extends laterally from one side edge portion of the main section 3 and contains the pointer 5. The interiors of the two sections 3 and 4 are in communication to permit the mounting arm 6 of the pointer 5 to extend into the main section 3 and cooperate with the control mechanism as hereinafter described. A front wall 7 of the lateral section 4 is transparent to permit positions of the pointer 5 to be observed, and operative positions of the system with which the indicator is to be associated, may be shown on a rear wall 8 of that lateral section. For example, when used as an automatic drive gear shift selector, the wall 8 will have the usual LSDNR Park shift selector positions stamped, etched or painted thereon (see FIG. 6). The front and rear walls 7 and 8 of the lateral section 4 are preferably substantially parallel and straight so as to form a straight passage 9 through which the pointer 5 can move.

The control mechanism, in the form shown in the drawings cooperates with the aforementioned mounting arm 6, which is located in the main section 3 of the housing 2 and is arranged to extend generally transverse to the passage 9. The pointer 5 is secured to one end of the arm 6 and projects laterally therefrom to locate in the passage 9 of the lateral housing section 4, and the pointer 5 and lever 6 are preferably formed integral from a plastics or other suitable material. The control mechanism connects the arm 6 to the housing 2, and comprises a fulcrum adjacent one end of the arm 6 and about which the arm 6 may swing, and guide means adjacent the other end of the arm 6 so as to maintain the pointer 5 in a substantially straight path of movement during swinging movement of the arm 6 about the fulcrum. It is generally preferred to have the guide means at or adjacent the pointer end of the arm 6, as is shown.

In the preferred construction shown it is necessary for the position of the fulcrum axis to change in the longitudinal direction of the arm 6, because the pointer 5 is held to a straight path during swinging movement of the arm 6 about the fulcrum. That may be achieved as shown, by forming the fulcrum as a cylindrical boss 11 which projects from a wall of the housing 2, preferably the base wall 12, and which slidably locates within a groove 13 formed in an adjacent surface of the arm 6 and extending longitudinally thereof. The fulcrum groove 13 is shown extending lengthwise of the arm 6 from the end thereof remote from the pointer 5, but it may be located at some other position along the arm 6. Furthermore, the same affect may be achieved by having the fulcrum boss 11 on the arm 6 and the groove 13 in a wall of the housing 2.

The guide means shown in the drawings also comprise a groove 14 and cooperable boss 15, but the groove 14 is formed in the base wall 12 of the housing 2 and extends substantially parallel to the pointer passage 9. The guide boss 15 may be formed integral with the arm 6 and projects from a surface thereof to slidably locate in the guide groove 14.

Actuating means for the construction described, when applied to a vehicle gear indicator, is preferably as shown in the drawings and includes a cable 16 (which is preferably double strand) connected to the indicator arm 6 and also being connectable to the gear shift mechanism (not shown) of the vehicle through a connector plate 10. A biasing spring 17 also forms part of the actuating means and is connected to the indicator arm 6 through a portion 18 of the cable 16, so as to urge the arm 6 in one particular direction. The arrangement is such that, when in use, tension on the cable 16 caused through shifting of the vehicle gear change mechanism, results in movement of the indicator arm 6 in one direction and an increase in the biasing spring pressure. When the cable tension is released or relieved by the gear change operation, the biasing spring 17 then acts to move the indicator arm 6 in the opposite direction.

Figure 2:
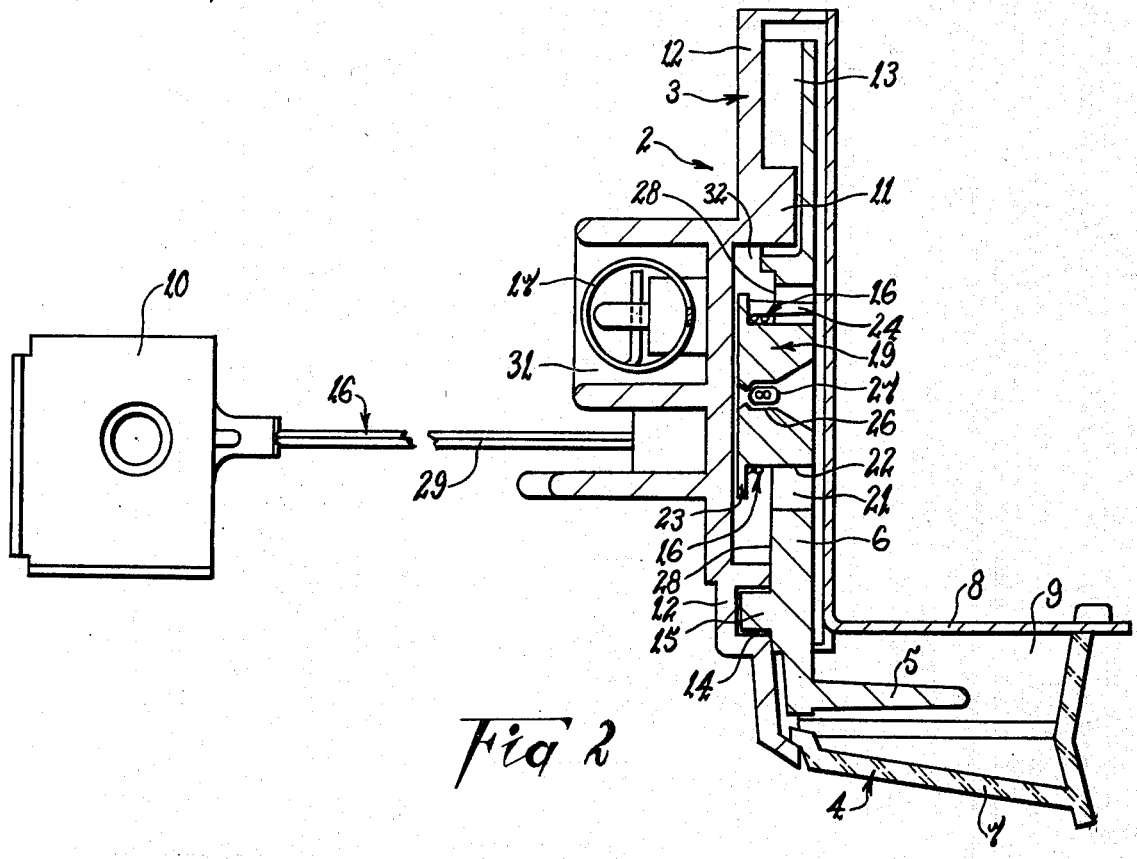
FIG. 2 is a cross-sectional view taken along line II—II of FIG. 1.

Connection between the cable 16 and indicator arm 6 can be effected in many ways, but in the construction shown includes the use of a reel element 19 formed integral with the body of the arm 6 so as to be disposed between the guide boss 15 and the fulcrum groove 13. An aperture 21 is formed through the arm 6 at each of two opposite sides of the reel element 19 so as to facilitate location of the cable 16 about the reel element 19. The reel 19 can take any form, but in the particular construction shown includes a cylindrical barrel 22 which projects beyond the under surface of the arm 6 as shown in FIG. 2, and a laterally projecting flange 23 extends from each of two sides of the projecting end of the barrel 22 so as to partially overlie respective apertures 21 and provide means for retaining the cable 16 on the barrel 22. A pin 24, lug 23 or other projection, extends from each flange 23 to locate in the respective aperture 21 in laterally spaced relationship to the cylindrical barrel 22, and thereby hold an adjacent section of the cable 16 close to the barrel 22 surface.

Attachment of the cable 16 to the reel 19 is obtained through a diametral slot 25 formed in the reel barrel 22 and which extends from the end of the barrel 22 remote from the flanges 23 and an enlarged recess 26 formed intermediate the length of that slot. The slot 25 is sufficiently wide to accept the cable 16, but not a ferrule 27 secured to the cable 16 between the ends thereof. The ferrule 27 is located in the recess 26 and acts against sides of that recess to transmit cable tension to the reel 19, and thereby to the indicator arm 6. It is preferred that the cable 16 is located well within the reel slot 25 so as to be disposed between the flanges 23 and the adjacent surface 28 of the arm 6, which in the construction shown, is the surface adjacent the base wall 12 of the housing 2.

It is further preferred that the reel slot 25 is arranged to extend transverse to the longitudinal axis of the indicator arm 6. The two portions 18 and 29 of the cable 16 extending from opposite sides of the reel 19, extend in the same general direction as the slot 25, but each emerges from the end of the slot 25 remote from the particular side of the housing 2 towards which the respective cable portion extends. The cable section 18 is connected to the biasing spring 17 in the manner hereinafter described, and the other portion 29 is secured to the connector plate 10 which is in turn connectable to the vehicle gear shift mechanism.

The biasing spring 17 is preferably of the helical tension type, and is located on the side of the housing base wall 12 opposite to that adjacent the indicator arm 6. It is further preferred that the spring 17 extends generally transverse to the longitudinal axis of the indicator arm 6 and is located in a tiered cross relationship to that arm, at least during part of the available range of travel of the arm 6. The spring 17 may be located within a chamber 31 of the housing 2 which is separated from the indicator lever compartment 32 by the housing base wall 12 which is also in the tiered relationship, and has one end secured to the housing 2 by an appropriate retainer 33 (see FIG. 3). The cable portion 18 is secured to the other end of the spring 17 through a link member 34 releasably attachable to the spring 17 and through which the cable 16 is looped. A ferrule 35 is used to secure the loop of the cable 16 to the link member 34, in a known manner. Use of the link member 34 assists in avoiding fretting of the cable, which is a problem in prior constructions.

With the construction described, the cable portion 18 extends around one side edge 36 of the base wall 12 so as to have a return portion arranged generally parallel to the main portion thereof. The side edge 36 of the base wall 12 may have a recess 37 (see FIG. 1) for locating the cable, and the base 38 of the recess 37 is preferably as shown in FIG. 3, curved to form a suitable bearing surface.

When the indicator is connected into a vehicle gear change system, movement of the gear change lever will cause corresponding movement of the indicator arm 6 through the cable connection. Thus, the arm 6 will swing about the axis of fulcrum boss 11, whilst the pointer 5 is caused to follow a straight path of travel by the guide means 14 and 15.

It will be appreciated that the invention described provides an indicator of compact construction, particularly in view of the relative positioning of the biasing spring and indicator arm. Because of the positioning, the housing size may be approximately 25% less than that of prior constructions.

The particular construction described may be modified in many ways without departing from the basic concept of the invention. By way of example, the cable may be attached direct to the indicator arm 6 rather than through the medium of a reel as described. That is, the cable attaching slot and recess may be formed in the actual body of the arm 6, or in a part secured thereto. Furthermore, the reel may be formed separate from the body of the arm and attached thereto in any appropriate manner.

Finally, it is to be understood that various alterations, modifications and/or additions may be introduced into the constructions and arrangements of parts previously described without departing from the spirit or ambit of the invention as defined by the appended claims.

Having now described my invention, what I claim as new and desire to secure by letters patent is:

1. A vehicle gear shift position indicator including;
a housing;
an indicator member;

control mechanism connecting said indicator member to said housing so that said member is movable relative to said housing between two extreme positions, and being operative to control the path of said movement;

an actuator cable connected at one end to a biasing spring and being connectable at its opposite end to the gear shift mechanism of said vehicle, and said cable being attached at a position between said ends to part of said indicator member so as to be operative to cause said movement of the indicator member;

said biasing spring and said indicator member part being located on opposite sides respectively of a wall of said housing so as to be in triple-tiered relationship with each other and said wall;

and said biasing spring is attached to said housing and arranged to influence said cable to move said indicator member in one particular direction of said movement.

2. A position indicator according to claim 1 wherein said cable is attached to said mounting arm through a reel element connected to said mounting arm, said reel element having a slot extending therethrough and arranged to be transverse to the longitudinal axis of said mounting arm, a recess is formed in said reel element between the ends of said slot, said cable passes through said slot and associated recess, and a ferrule is secured to said cable and is located within said recess, said ferrule being of a size such as to be unable to enter said slot and thereby holds said cable against substantially longitudinal movement relative to said reel element.

3. A position indicator according to claim 2, wherein portions of said cable extend laterally away from said reel element in the general direction of said slot, on each of two opposite sides of said reel element;

each said portion extending back around a surface of said reel element after emerging from said slot so as to extend away from the side of the reel element opposite to the side thereof at which it emerges from the slot.

4. A position indicator according to claim 1, wherein said indicator member comprises a pointer element and a mounting arm secured to and extending laterally from one end of said pointer element;

said control mechanism includes a fulcrum boss secured to said housing wall and slidably located in a fulcrum groove formed in said mounting arm and extend longitudinally thereof, and a guide boss secured to said mounting arm and slidably located in a guide groove formed in said housing wall and extending generally transverse to said longitudinal axis of the mounting arm;

said fulcrum groove and said guide boss being located adjacent opposite ends respectively of said mounting arm, and said cable is attached to said mounting arm at a position between said fulcrum groove and said guide boss.

* * * * *